United States Patent
Huang et al.

(10) Patent No.: US 9,944,007 B2
(45) Date of Patent: *Apr. 17, 2018

(54) MULTIFUNCTIONAL BOPP CIGARETTE PACKAGING FILM AND MANUFACTURING METHOD THEREOF

(71) Applicant: Zhejiang Great Southeast Packaging Co., Ltd., Zhuji (CN)

(72) Inventors: Shuishou Huang, Zhuji (CN); Jiayi Guo, Zhuji (CN)

(73) Assignee: Zhejiang Great Southeast Packaging Co., Ltd., Zhuji, Zhejiang (CN)

( * ) Notice: Subject to any disclaimer, the term of this patent is extended or adjusted under 35 U.S.C. 154(b) by 507 days.

This patent is subject to a terminal disclaimer.

(21) Appl. No.: 14/592,398

(22) Filed: Jan. 8, 2015

(65) Prior Publication Data

US 2015/0123321 A1    May 7, 2015

Related U.S. Application Data

(62) Division of application No. 13/521,644, filed as application No. PCT/CN2011/077949 on Aug. 3, 2011, now Pat. No. 9,144,931.

(30) Foreign Application Priority Data

Nov. 9, 2010    (CN) .......................... 2010 1 0535985

(51) Int. Cl.
*B32B 27/08*    (2006.01)
*B29C 47/06*    (2006.01)
(Continued)

(52) U.S. Cl.
CPC ........ *B29C 47/065* (2013.01); *B29C 47/0021* (2013.01); *B29C 47/0057* (2013.01);
(Continued)

(58) Field of Classification Search
CPC .. B29C 47/0057; B29C 47/065; B29C 55/143
See application file for complete search history.

(56) References Cited

U.S. PATENT DOCUMENTS 6,332,940 B1 * 12/2001 Lin ..................... B29C 55/023
156/229
6,495,246 B1 * 12/2002 Sakaguchi .............. B32B 27/18
428/215
(Continued)

FOREIGN PATENT DOCUMENTS

CN    101628645 A    1/2010
CN    201614084 U    10/2010
(Continued)

OTHER PUBLICATIONS

International Search Report in International Application No. PCT/CN2011/077949, filed Aug. 3, 2011.

*Primary Examiner* — Christina A Johnson
*Assistant Examiner* — Kelsey C Grace
(74) *Attorney, Agent, or Firm* — Saliwanchik, Lloyd & Eisenschenk (57) ABSTRACT

A multifunctional BOPP cigarette packaging film comprises an upper layer (1), a middle-upper layer (2), a middle layer (3), a middle-lower layer (4) and a lower layer (5). The upper layer (1) is a binary copolymerized polypropylene surface layer, both the middle-upper layer (2) and the middle-lower layer (4) are homopolymerized polypropylene antibacterial agent layers, the middle layer (3) is a homopolymerized polypropylene stiffening agent layer, the lower layer (5) is a binary copolymerized polypropylene bottom surface layer. Also disclosed is a manufacturing method for the multifunctional BOPP cigarette packaging film. The packaging film acts as an effective barrier, has slip property and relatively (Continued)

low moisture permeability as well as low cost, and is suitable for a high-speed packing machine.

12 Claims, 2 Drawing Sheets (51) Int. Cl.
*B32B 27/18* (2006.01)
*B32B 27/32* (2006.01)
*B29C 55/02* (2006.01)
*B29C 47/00* (2006.01)
*B29C 55/14* (2006.01)
*B29C 71/04* (2006.01)
*B41F 17/00* (2006.01)
*B29K 23/00* (2006.01)
*B29K 21/00* (2006.01)

(52) U.S. Cl.
CPC .......... *B29C 55/023* (2013.01); *B29C 55/143* (2013.01); *B29C 71/04* (2013.01); *B32B 27/08* (2013.01); *B32B 27/18* (2013.01); *B32B 27/32* (2013.01); *B41F 17/00* (2013.01); *B29K 2021/003* (2013.01); *B29K 2023/10* (2013.01); *B29K 2023/12* (2013.01); *B29K 2023/14* (2013.01); *B29K 2995/0053* (2013.01); *B32B 2270/00* (2013.01); *B32B 2274/00* (2013.01); *B32B 2307/412* (2013.01); *B32B 2307/514* (2013.01); *B32B 2307/7145* (2013.01); *B32B 2307/7246* (2013.01); *B32B 2307/746* (2013.01); *B32B 2553/00* (2013.01); *Y10T 428/31909* (2015.04)

(56) References Cited

U.S. PATENT DOCUMENTS

| | | | |
|---|---|---|---|
| 9,144,931 | B2* | 9/2015 | Huang .................... B32B 27/08 |
| 2004/0065052 | A1 | 4/2004 | Ramesh et al. |
| 2005/0084636 | A1 | 4/2005 | Papenfuss et al. |
| 2006/0046061 | A1 | 3/2006 | Mills et al. |
| 2009/0098364 | A1* | 4/2009 | Honda .................... B32B 27/32 428/328 |

FOREIGN PATENT DOCUMENTS

| | | |
|---|---|---|
| CN | 201619778 U | 11/2010 |
| CN | 102085735 A | 6/2011 |

* cited by examiner

MULTIFUNCTIONAL BOPP CIGARETTE PACKAGING FILM AND MANUFACTURING METHOD THEREOF

CROSS-REFERENCE TO RELATED APPLICATIONS

This application is a divisional of U.S. application Ser. No. 13/521,644, filed Jul. 11, 2012, which is the U.S. national stage application of International Patent Application No. PCT/CN2011/077949, filed Aug. 3, 2011, which claims priority to Chinese Patent Application No. 201010535985.X, filed Nov. 9, 2010, which are hereby incorporated by reference in their entirety.

BACKGROUND

Technical Field

The present invention relates to a cigarette packaging film and a manufacturing method thereof.

Background of the Invention

At present, the cigarette packaging film (cigarette film for short) used by domestic cigarette production enterprises is generally a biaxially-oriented polypropylene film (BOPP film for short). Because the BOPP film has high transparency, cigarettes packaged by the BOPP film are stiff and smooth, noble and doubled in price; and because the BOPP film has low price and moderate cost, the BOPP film is applied on a large scale in the cigarette production enterprises.

However, the conventional BOPP film has many defects in long-term use:

(1) because the BOPP film has poor blocking performance and the moisture penetrability thereof reaches 2.0 g/m²·24H, the BOPP film affects moisture protection of cigarettes. The cigarette product has high requirement for the moisture protection, because mildew caused by moisture is quickly grown to produce peculiar smell of the cigarettes, and customers can distinguish it upon smoking and certainly require for returning. Warehouses of cigarette plants and tobacco companies have extremely good moisture-proof performance, and big boxes of cigarettes stored in the warehouses with extremely good sealing property are not moisturized; but retail stores have no special warehouses, and cigarette packages stored in simple storage containers such as iron boxes and the like are easily moisturized and mildewed due to long retail period, much rainwater and moist climate in the south, so great loss is brought to the enterprises.

(2) with rapid development of cigarette machinery, more and more full-automatic high-speed packaging machines are introduced, and the packaging speed of the cigarettes is quicker and quicker, so the requirement for the cigarette film is higher and higher. The conventional cigarette film using the old-fashioned packaging machinery is not smooth in packaging, for the high-speed packaging machines have higher requirements for slip property, anti-blocking property, toughness and the like of the film. Therefore, the film must be improved on structure, process and formula to meet the requirements of the high-speed packaging machines.

(3) the packaging expense is a costly expenditure in the cigarette industry. Under the equivalent degree of the packaging quality, packages should be lightened to respond energy conservation and emission reduction raised by the government, so the improvement on the cigarette film is urgent.

(4) the cigarette industry has fat profits, the events that lawbreakers produce fake cigarettes to obtain high profits by infringing brands emerge endlessly, and the customers have poor identification ability on the cigarettes, so the anti-counterfeiting work on cigarette packages must be enhanced.

Aiming at the condition that the conventional cigarette packaging film cannot adapt to the development, the cigarette packaging film is required to be improved to meet the requirement of "low carbon" economy so as to meet the development requirement of the tobacco industry.

BRIEF SUMMARY

In order to overcome the defects that the conventional cigarette packaging film has poor blocking property, over high moisture penetrability and poor smoothness as well as high cost, and cannot be applied to the occasions of high-speed packaging machines, the present invention provides a multifunctional BOPP cigarette packaging film with good blocking property, low moisture penetrability, good slip property, capability of being effectively applied to the occasions of high-speed packaging machines and low cost, and also the present invention provides a manufacturing method thereof.

For solving the technical problems, the present invention adopts the technical scheme:

a multifunctional BOPP cigarette packaging film, the multifunctional BOPP cigarette packaging film comprises an upper layer, a middle-upper layer, a middle layer, a middle-lower layer and a lower layer, wherein the upper layer is a binary copolymerized polypropylene surface layer, both the middle-upper layer and the middle-lower layer are homopolymerized polypropylene antibacterial agent layers, the middle layer is a homopolymerized polypropylene stiffening agent layer, the lower layer is a binary copolymerized polypropylene bottom surface layer, the middle-lower layer covers the lower layer, the middle layer covers the middle-lower layer, the middle-upper layer covers the middle layer, and the upper layer covers the middle-upper layer;

in the multifunctional BOPP cigarette packaging film, the upper layer accounts for 8 to 15 percent of the total mass, the middle-upper layer accounts for 12 to 21 percent of the total mass, the middle layer accounts for 38 to 50 percent of the total mass, the middle-lower layer accounts for 12 to 21 percent of the total mass, and the lower layer accounts for 8 to 15 percent of the total mass;

the binary copolymerized polypropylene surface layer and the binary copolymerized polypropylene bottom surface layer respectively comprise the following three components in parts by mass: 7 to 11 parts of binary copolymerized polypropylene, 0.5 to 3.5 parts of thermoplastic elastomer, and 0.5 to 3.5 parts of super-slip/anti-blocking master batch;

the homopolymerized polypropylene antibacterial agent layer comprises the following three components in parts by mass: 11 to 14 parts of homopolymerized polypropylene (PP), 0.5 to 3.5 parts of antibacterial master batch, and 0.5 to 3.5 parts of rapid migration antistatic master batch;

the homopolymerized polypropylene stiffening agent layer comprises the following three components in parts by mass: 25.5 to 32.5 parts of homopolymerized polypropylene (PP), 0.5 to 4.5 parts of antistatic/slip master batch, and 5 to 20 parts of special stiffening master batch.

A manufacturing method for the multifunctional BOPP cigarette packaging film, comprising the following steps:

(1) selecting materials: in the multifunctional BOPP cigarette packaging film, the upper layer is a binary copolymerized polypropylene surface layer, the middle-upper layer and the middle-lower layer are homopolymerized polypropylene antibacterial agent layers, the middle layer is a homopolymerized polypropylene stiffening agent layer, and the lower layer is a binary copolymerized polypropylene bottom surface layer;

the upper layer accounts for 8 to 15 percent of the total mass, the middle-upper layer accounts for 12 to 21 percent of the total mass, the middle layer accounts for 38 to 50 percent of the total mass, the middle-lower layer accounts for 12 to 21 percent of the total mass, and the lower layer accounts for 8 to 15 percent of the total mass;

the binary copolymerized polypropylene surface layer and the binary copolymerized polypropylene bottom surface layer respectively comprise the following three components in parts by mass: 7 to 11 parts of binary copolymerized polypropylene, 0.5 to 3.5 parts of thermoplastic elastomer, and 0.5 to 3.5 parts of super-slip/anti-blocking master batch;

the homopolymerized polypropylene antibacterial agent layer comprises the following three components in parts by mass: 11 to 14 parts of homopolymerized polypropylene (PP), 0.5 to 3.5 parts of antibacterial master batch, and 0.5 to 3.5 parts of rapid migration antistatic master batch;

the homopolymerized polypropylene stiffening agent layer comprises the following three components in parts by mass: 25.5 to 32.5 parts of homopolymerized polypropylene (PP), 0.5 to 4.5 parts of antistatic/slip master batch, and 5 to 20 parts of special stiffening master batch;

(2) manufacturing the film: a co-extrusion biaxial orienting method is adopted, comprising the following processes:

(2.1) feeding prepared mixtures into five extruders through a feeder, wherein the five extruders respectively correspond to the upper layer, the middle-upper layer, the middle layer, the middle-lower layer and the lower layer; extruding in a molten state, filtering for multiple times through a filter, feeding the filtrate into a T-shaped die head, and extruding the melt through a die lip;

(2.2) tape-casting: tightly attaching the melt extruded from the die lip to the surface of a quenching roller, and forming a cast film under the actions of the quenching roller, a water bath and a guide roller;

(2.4) orienting: leading out the cast film, and performing longitudinal orienting and then transverse orienting;

(2.5) cooling and forming;

(2.6) traction winding-up: winding the film into a cylindrical film roll by edge cutting, thickness measuring and corona treatment, and thus obtaining the multifunctional BOPP cigarette packaging film.

Further, the manufacturing method also comprises the following steps:

(3) finishing:

(3.1) ageing treatment: putting a big roll film on a film collecting rack, and performing ageing treatment for 24 hours;

(3.2) cutting and processing the aged big roll film to obtain small roll films.

Still further, the manufacturing method also comprises the following steps:

(4) printing:

(4.1) making a plate through a plate roller in a laser plate making factory according to the anti-counterfeiting color patterns required to be printed by the design of a cigarette factory;

(4.2) performing anti-counterfeiting printing on the cut small roll films by using fluorescent anti-counterfeiting ink together with color ink in a film color printer, and automatically drying the small roll films in the printing process;

(4.3) automatically winding the anti-counterfeiting color film;

(4.4) cutting in a cutting machine, and thus obtaining the packaging film required by the cigarette factory.

Still further, in the step (1), according to the proportioning table of each layer, raw materials are conveyed to a proportioning machine by spiral conveying and vibrating conveying and proportioned uniformly; and the mixture is conveyed to a material bin of an extruder corresponding to each layer through a feeder.

In the step (2.3), longitudinal orienting is realized under the actions of orienting rollers at different shaft speed and a plurality of pairs of heating rollers in between of a longitudinal orienting mechanism; and in a transverse area, two sides of the film are clamped by a chain clamp, the film moves forward along a gradually widening track, the width of the film meets the requirement through a heating area and a setting area, and the film reaches the set thickness and width after longitudinal orienting and transverse orienting.

The present invention has following main advantages:

(1) the phenomenon that cigarettes are mildewed by sucking moist gas due to poor blocking property of the BOPP cigarette packaging film is solved, the problem that the cigarettes are mildewed and deteriorated in the quality guarantee period is thoroughly solved, the quality of the cigarettes is effectively ensured, and the loss of enterprises is reduced.

(2) the condition that the BOPP cigarette film cannot be applied to packaging by imported high-speed packaging machines is effectively solved, and the structure, the raw materials, the formula and the process of the product are comprehensively improved to realize normal high-speed packaging.

(3) when the cigarette film is produced, the cigarette film is subjected to anti-counterfeiting marking and trademark treatment, so that the customers can identify the sold products clearly at a glance.

DETAILED DESCRIPTION

The present invention is further described by combining the following embodiments, but the protective range of the prevent invention is not limited in the embodiments.

Embodiment 1

Figure 1:
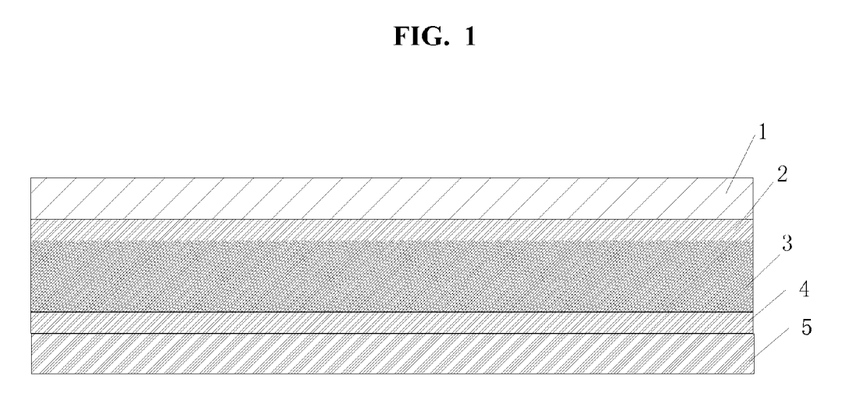
FIG. 1 is a structural schematic diagram of a multifunctional BOPP cigarette packaging film.

Referring to the FIG. 1, a multifunctional BOPP cigarette packaging film, the multifunctional BOPP cigarette packaging film comprises an upper layer 1, a middle-upper layer 2, a middle layer 3, a middle-lower layer 4 and a lower layer 5, wherein the upper layer 1 is a binary copolymerized polypropylene surface layer, the middle-upper layer 2 and the middle-lower layer 4 are homopolymerized polypropylene antibacterial agent layers, the middle layer 3 is a homopolymerized polypropylene stiffening agent layer, the lower layer 5 is a binary copolymerized polypropylene bottom surface layer, the middle-lower layer covers the lower layer, the middle layer covers the middle-lower layer, the middle-upper layer covers the middle layer, and the upper layer covers the middle-upper layer;

in the multifunctional BOPP cigarette packaging film, the upper layer accounts for 8 to 15 percent of the total mass, the middle-upper layer accounts for 12 to 21 percent of the total mass, the middle layer accounts for 38 to 50 percent of the total mass, the middle-lower layer accounts for 12 to 21 percent of the total mass, and the lower layer accounts for 8 to 15 percent of the total mass;

the binary copolymerized polypropylene surface layer and the binary copolymerized polypropylene bottom surface layer respectively comprise the following three components in parts by mass: 7 to 11 parts of binary copolymerized polypropylene, 0.5 to 3.5 parts of thermoplastic elastomer, and 0.5 to 3.5 parts of super-slip/anti-blocking master batch;

the homopolymerized polypropylene antibacterial agent layer comprises the following three components in parts by mass: 11 to 14 parts of homopolymerized polypropylene (PP), 0.5 to 3.5 parts of antibacterial master batch, and 0.5 to 3.5 parts of rapid migration antistatic master batch;

the homopolymerized polypropylene stiffening agent layer comprises the following three components in parts by mass: 25.5 to 32.5 parts of homopolymerized polypropylene (PP), 0.5 to 4.5 parts of antistatic/slip master batch, and 5 to 20 parts of special stiffening master batch.

In the embodiment, the upper layer accounts for 8 percent of the total mass, the middle-upper layer accounts for 12 percent of the total mass, the middle layer accounts for 48 percent of the total mass, the middle-lower layer accounts for 20 percent of the total mass, and the lower layer accounts for 12 percent of the total mass;

in the binary copolymerized polypropylene surface layer and the binary copolymerized polypropylene bottom surface layer, the adopted binary copolymerized polypropylene is a product of BSELL Company, the mark is 7384PP, and the isotacticity must reach 99 to 99.5 percent; the adopted thermoplastic elastomer is a product of SEBS Dutch Shell Chemical Company, and the mark is G1652; the adopted super-slip/anti-blocking master batch is a product of German Constab Factory, and the mark is AG6554PPC; and the mass ratio in parts of the three components is: 7 parts of binary copolymerized polypropylene, 0.5 parts of thermoplastic elastomer, and 0.5 parts of super-slip/anti-blocking master batch;

in the homopolymerized polypropylene antibacterial agent layer, the adopted homopolymerized PP is a product of BSELL Company, the mark is 8182PP, the required resin intrinsic viscosity is between 0.58 and 0.65, the distribution range of the molecular weight is narrow and fluctuates between +/−0.01, and the content of impurity and gel is particularly low and less than or equal to 0.2 percent; the adopted antibacterial master batch is a product of Shanghai Virei New Material Co., Ltd., and the mark is PP-BMFZ; the adopted rapid migration antistatic master batch is a product of German Constab Factory, and the mark is AT4.63PP; and the mass ratio in parts of the three components is: 11 parts of homopolymerized PP, 0.5 parts of antibacterial master batch, and 0.5 parts of rapid migration antistatic master batch;

in the homopolymerized polypropylene stiffening agent layer, the adopted homopolymerized polypropylene is a product of BSELL Company, the mark is 8182PP, the required resin intrinsic viscosity is between 0.58 and 0.65, the distribution range of the molecular weight is narrow and fluctuates between +/−0.01, and the content of impurity and gel is particularly low and less than or equal to 0.2 percent; the adopted antistatic/slip master batch is a product of German Constab Factory, and the mark is ATG4504PP; the adopted special stiffening master batch is a product of German Constab Factory, and the mark is MA0936PP; and the mass ratio in parts of the three components is: 25.5 parts of homopolymerized PP, 0.5 parts of antistatic/slip master batch, and 5 parts of special stiffening master batch.

The multifunctional cigarette packaging film of the embodiment fulfills the goal of saving 20 percent of raw materials based on the conventional package. The produced cigarette film is thinner, and has higher transparency, better antibacterial performance, better slip and anti-blocking property and high stiffness. Properties are converted by adopting the following measures:

(1) First, when the ultrathin multifunctional cigarette film is implemented, raw materials are key conditions for manufacturing the ultrathin cigarette film. Because the cigarette film to be manufactured saves 20 percent of materials compared with the conventional cigarette film, the film must be thinner and better in quality and then can undergo the operation of the high-speed packaging machines. The raw materials which are unclean and do not meet the requirements result in production failure. A balance point of intrinsic viscosity of polyester is ensured by repeatedly selecting the polyester and testing the viscosity of the polyester. If the intrinsic viscosity of the polyester is over high, a large orienting force is required, non-uniform orienting is easily caused, and the thickness tolerance cannot be well controlled; and if the intrinsic viscosity is low, the molecular weight is small, the crystallization speed is high, and the film rupture rate is raised. Therefore, the selection of the size of the PP polyester is very important for the success rate of producing the ultrathin BOPP cigarette film; the optimal intrinsic viscosity should be between 0.58 and 0.65; and the fluctuation range of the molecular weight of the polyester PP must be less than or equal to +/−0.01, and the content of impurity and gel is less than or equal 0.02 percent. The isotacticity of the binary polyester must be between 99 and 99.5 percent. The above conditions are basic conditions for producing the ultrathin cigarette packaging film.

(2) The added master batches must be superfine and uniformly dispersed master batches, and experiments of observing pressed tablets under a microscope show that the particle diameter of the master batches is less than 1.5 microns and the master batches can be fully dispersed uniformly. The master batches produced by German Constab Factory have good quality and meet the requirements of ultrathin orienting. The products of the factory can reduce the influence on the haze, frostwork and white points of the ultrathin product and increase the optical performance of the film, so the product is preferred.

(3) The original imported BOPP production line is necessarily reformed to ensure normal production of the ultrathin cigarette film as the following measures:

A, the density of the melt through a filter in the production line is greatly increased by replacing the original 30-40 μm crude filter and the original 20-30 μm fine filter for producing the BOPP cigarette film of 22 μm with high-quality discs plate filters, namely a 25 μm cruder filter and a 15 μm fine filter, so that the ultrathin film is prevented from being broken by large impurities and gel during orienting.

B, the diameter of a cooling roller is increased by improving the cooling roller after longitudinal orienting and the structure of a cooling runner is designed, so that quick cooling can be performed after longitudinal orienting and the crystallization degree can be controlled to be minimum, to create an optimal tensile attraction condition for transverse orienting.

C, a transverse orienting and heat setting air flue system is improved to accurately adjust balance and temperature uniformity of a wind field and wind pressure uniformity and temperature uniformity of the wind field in the whole transverse orienting, which is very important for implementing uniform orienting of the BOPP film, and is key control point of subsequent uniformity and continuous normal production of the film.

D, a good winding procedure in the ultrathin BOPP cigarette film production process is also very important, and by adopting the latest designed winding technology controlled by an accurate lead screw and a linear step motor in BRUECKER, the ultrathin BOPP cigarette film is wound uniformly and the surface of the ultrathin BOPP cigarette film is smooth and has no creases.

E, in order to adapt to continuous production of the ultrathin BOPP cigarette film, the transverse orienting clamp is replaced, so that the corresponding range of the opening of the clamp is reduced, and film rupture for not seizing the edge of the film is avoided when the cigarette film is produced.

Properties of the antibacterial master batch of the embodiment:

The antibacterial master batch PP-BMFZ is a polypropylene antibacterial master batch prepared by assembling preferred antibacterial functional groups into basic polyester polypropylene molecules by using a molecular assembly antibacterial technology. The antibacterial master batch is added into polyester in a certain ratio and prepared into the film by biaxial orienting; since the antibacterial functional groups have extremely strong polarity, finally, the functional groups are successively aggregated on the surface of the film to produce an antibacterial effect; the antibacterial master batch is safe and nontoxic, belongs to a nontoxic and non-stimulation substance, and is suitable for food packaging; and the master batch has the following properties:

A, high antibacterial spectral efficiency extremely excellent inhibiting effect on multiple harmful bacteria, mildew and viruses, for example, the antibacterial rates of *escherichia coli* and *staphylococcus aureus* harmful to the human body and the video reach 99.92 and 99.99 percent;

B, good mildew resistance, wherein the mildew resistant effect reaches the first level according to the tests of *aspergillus niger, aspergillus flavus, aspergillus versicolor, chaetomium globosum, aureobasidium pullulans, penicillium citrinum, trichoderma viride* and the like;

C, long-acting antibacterial effect, namely as long as the film exits, the antibacterial effect of the film does not fade; and C, high-temperature resistance, namely the antibacterial effect of the antibacterial master batch is not changed by high-temperature extrusion.

Embodiment 2

In the embodiment, the upper layer accounts for 10 percent of the total mass, the middle-upper layer accounts for 15 percent of the total mass, the middle layer accounts for 45 percent of the total mass, the middle-lower layer accounts for 21 percent of the total mass, and the lower layer accounts for 9 percent of the total mass;

the binary copolymerized polypropylene surface layer and the binary copolymerized polypropylene bottom surface layer respectively comprise the following three components in parts by mass: 8 parts of binary copolymerized polypropylene, 1 part of thermoplastic elastomer, and 1 part of super-slip/anti-blocking master batch;

the homopolymerized polypropylene antibacterial agent layer comprises the following three components in parts by mass: 12 parts of homopolymerized polypropylene (PP), 1 part of antibacterial master batch, and 1 part of rapid migration antistatic master batch;

the homopolymerized polypropylene stiffening agent layer comprises the following three components in parts by mass: 26 parts of homopolymerized polypropylene (PP), 1 part of antistatic/slip master batch, and 6 parts of special stiffening master batch.

Other schemes of the embodiment are as same as those of the embodiment 1.

Embodiment 3

In the embodiment, the upper layer accounts for 12 percent of the total mass, the middle-upper layer accounts for 18 percent of the total mass, the middle layer accounts for 50 percent of the total mass, the middle-lower layer accounts for 12 percent of the total mass, and the lower layer accounts for 8 percent of the total mass;

the binary copolymerized polypropylene surface layer and the binary copolymerized polypropylene bottom surface layer respectively comprise the following three components in parts by mass: 9 parts of binary copolymerized polypropylene, 1.5 parts of thermoplastic elastomer, and 1.6 parts of super-slip/anti-blocking master batch;

the homopolymerized polypropylene antibacterial agent layer comprises the following three components in parts by mass: 13 parts of homopolymerized polypropylene (PP), 1.5 parts of antibacterial master batch, and 1.8 parts of rapid migration antistatic master batch;

the homopolymerized polypropylene stiffening agent layer comprises the following three components in parts by mass: 28 parts of homopolymerized polypropylene (PP), 1.5 parts of antistatic/slip master batch, and 8 parts of special stiffening master batch.

Other schemes of the embodiment are as same as those of the embodiment 1.

Embodiment 4

In the embodiment, the upper layer accounts for 14 percent of the total mass, the middle-upper layer accounts for 20 percent of the total mass, the middle layer accounts for 38 percent of the total mass, the middle-lower layer accounts for 13 percent of the total mass, and the lower layer accounts for 15 percent of the total mass;

the binary copolymerized polypropylene surface layer and the binary copolymerized polypropylene bottom surface layer respectively comprise the following three components in parts by mass: 10 parts of binary copolymerized polypropylene, 2.2 parts of thermoplastic elastomer, and 2.4 parts of super-slip/anti-blocking master batch;

the homopolymerized polypropylene antibacterial agent layer comprises the following three components in parts by mass: 14 parts of homopolymerized polypropylene (PP), 2.5 parts of antibacterial master batch, and 2.8 parts of rapid migration antistatic master batch;

the homopolymerized polypropylene stiffening agent layer comprises the following three components in parts by mass: 30 parts of homopolymerized polypropylene (PP), 2.5 parts of antistatic/slip master batch, and 10 parts of special stiffening master batch.

Other schemes of the embodiment are as same as those of the embodiment 1.

Embodiment 5

In the embodiment, the upper layer accounts for 15 percent of the total mass, the middle-upper layer accounts for 21 percent of the total mass, the middle layer accounts for 42 percent of the total mass, the middle-lower layer accounts for 13 percent of the total mass, and the lower layer accounts for 9 percent of the total mass;

the binary copolymerized polypropylene surface layer and the binary copolymer polypropylene bottom surface layer respectively comprise the following three components in part by mass: 11 parts of binary copolymer polypropylene, 3.5 parts of thermoplastic elastomer, and 3.5 parts of super-smooth/anti-sticky master batch;

the homopolymerized polypropylene antibacterial agent layer comprises the following three components in parts by mass: 13.5 parts of homopolymerized polypropylene (PP), 3.5 parts of antibacterial master batch, and 3.5 parts of rapid migration antistatic master batch;

the homopolymerized polypropylene stiffening agent layer comprises the following three components in parts by mass: 32.5 parts of homopolymerized polypropylene (PP), 4.5 parts of antistatic/smooth master batch, and 20 parts of special stiffening master batch.

Other schemes of the embodiment are as same as those of the embodiment 1.

Embodiment 6

Figure 2:
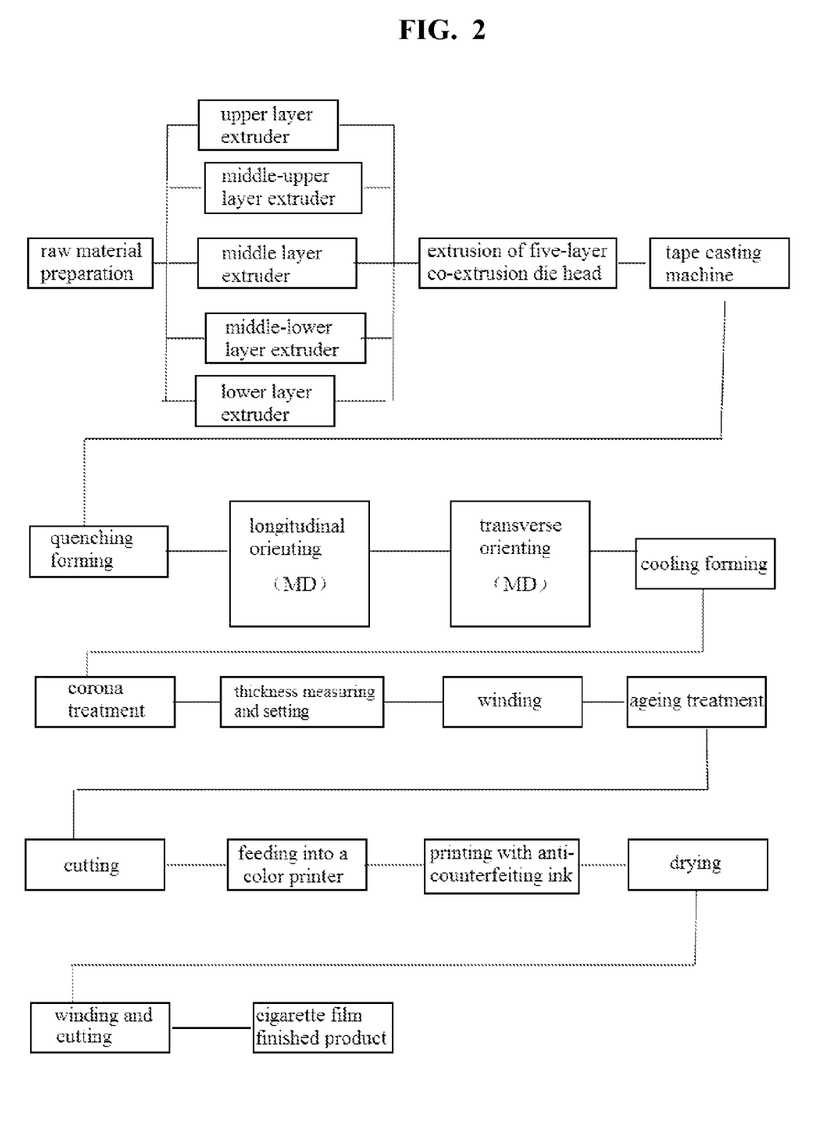
FIG. 2 is a process flow diagram of a manufacturing method for the multifunctional BOPP cigarette packaging film.

Referring to the FIG. 1 and the FIG. 2, a manufacturing method for the multifunctional BOPP cigarette packaging film, comprising the following steps:

(1) selecting materials: in the multifunctional BOPP cigarette packaging film, the upper layer is a binary copolymerized polypropylene surface layer, the middle-upper layer and the middle-lower layer are homopolymerized polypropylene antibacterial agent layers, the middle layer is a homopolymerized polypropylene stiffening agent layer, and the lower layer is a binary copolymerized polypropylene bottom surface layer;

the upper layer accounts for 8 to 15 percent of the total mass, the middle-upper layer accounts for 12 to 21 percent of the total mass, the middle layer accounts for 38 to 50 percent of the total mass, the middle-lower layer accounts for 12 to 21 percent of the total mass, and the lower layer accounts for 8 to 15 percent of the total mass;

the binary copolymerized polypropylene surface layer and the binary copolymerized polypropylene bottom surface layer respectively comprise the following three components in parts by mass: 7 to 11 parts of binary copolymerized polypropylene, 0.5 to 3.5 parts of thermoplastic elastomer, and 0.5 to 3.5 parts of super-slip/anti-blocking master batch;

the homopolymerized polypropylene antibacterial agent layer comprises the following three components in parts by mass: 11 to 14 parts of homopolymerized polypropylene (PP), 0.5 to 3.5 parts of antibacterial master batch, and 0.5 to 3.5 parts of rapid migration antistatic master batch;

the homopolymerized polypropylene stiffening agent layer comprises the following three components in parts by mass: 25.5 to 32.5 parts of homopolymerized polypropylene (PP), 0.5 to 4.5 parts of antistatic/slip master batch, and 5 to 20 parts of special stiffening master batch;

(2) manufacturing the film: a co-extrusion biaxial orienting method is adopted, comprising the following processes:

(2.1) feeding prepared mixtures into five extruders through a feeder, wherein the five extruders respectively correspond to the upper layer, the middle-upper layer, the middle layer, the middle-lower layer and the lower layer; extruding in a molten state, filtering for multiple times through a filter, feeding the filtrate into a T-shaped die head, and extruding the melt through a die lip;

(2.2) tape-casting: tightly attaching the melt extruded from the die lip to the surface of a quenching roller, and forming a cast film under the actions of the quenching roller, a water bath and a guide roller;

(2.4) orienting: leading out the cast film, and performing longitudinal orienting and then transverse orienting;

(2.5) cooling and forming;

(2.6) traction winding-up: winding the film into a cylindrical film roll by edge cutting, thickness measuring and corona treatment, and thus obtaining the multifunctional BOPP cigarette packaging film.

The manufacturing method also comprises the following steps:

(3) finishing:

(3.1) ageing treatment: putting a big roll film on a film collecting rack, and performing ageing treatment for 24 hours;

(3.2) cutting and processing the aged big roll film to obtain small roll films.

The manufacturing method also comprises the following steps:

(4) printing:

(4.1) making a plate through a plate roller in a laser plate making factory according to the anti-counterfeiting color patterns required to be printed by the design of a cigarette factory;

(4.2) performing anti-counterfeiting printing on the cut small coil films by using matching of fluorescent anti-counterfeiting ink together with color ink in a film color printer, and automatically drying the small coil films in the printing process;

(4.3) automatically winding the anti-counterfeiting color film;

(4.4) cutting in a cutting machine, and thus obtaining the packaging film required by the cigarette factory.

Further, in the step (1), according to the proportioning table of each layer, raw materials are conveyed to a proportioning machine by spiral conveying and vibrating conveying and proportioned uniformly; and the mixture is conveyed to a material bin of an extruder corresponding to each layer through a feeder.

In the embodiment, the upper layer accounts for 8 percent of the total mass, the middle-upper layer accounts for 12 percent of the total mass, the middle layer accounts for 48 percent of the total mass, the middle-lower layer accounts for 20 percent of the total mass, and the lower layer accounts for 12 percent of the total mass;

the binary copolymerized polypropylene surface layer and the binary copolymerized polypropylene bottom surface layer respectively comprise the following three components in parts by mass: 7 parts of binary copolymerized polypropylene, 0.5 parts of thermoplastic elastomer, and 0.5 parts of super-slip/anti-blocking master batch;

the homopolymerized polypropylene antibacterial agent layer comprises the following three components in parts by mass: 11 parts of homopolymerized polypropylene (PP), 0.5 parts of antibacterial master batch, and 0.5 parts of rapid migration antistatic master batch;

the homopolymerized polypropylene stiffening agent layer comprises the following three components in parts by mass: 25.5 parts of homopolymerized polypropylene (PP), 0.5 parts of antistatic/slip master batch, and 5 parts of special stiffening master batch.

According to the multifunctional cigarette packaging film produced in the embodiment, a thought of combining color ink with anti-counterfeiting ink together is applied in the design and cooperates with cigarette color patterns in the film to make the whole picture bright and clear; in sunlight or under an ultraviolet lamp, the anti-counterfeiting mark is fused into the patterns, so that the cigarettes become noble; and because the anti-counterfeiting mark is obvious and concealed, the cigarettes are easily identified by the customers.

Process parameters of the embodiment are:

A, an extrusion system a main extruder, namely a middle layer extruder, the temperature of which is controlled to be between 225° C. and 255° C.; auxiliary extruders, namely an upper layer extruder, a middle-upper layer extruder, a middle-lower layer extruder and a lower layer extruder, the temperatures of which are controlled to be between 220° C. and 250° C.;

the temperature of the extrusion system is adjusted after the polyester melt flow rate (MFR) value, the screw thread extruding linear speed and the form of extruder screws are subjected to comprehensive factor evaluation;

B, a thick sheet forming system the temperature of a multi-layer die head is controlled to be between 235° C. and 260° C.;

the cooling water temperature of a quenching roller is between 15° C. and 30° C.

C, a longitudinal orienting system a preheating part: 90° C.-125° C.;

an orienting part: 70° C.-90° C.;

a setting part: 100° C.-120° C.

orienting times: 0.8-3.5 times;

D, a transverse orienting system a preheating part: 160° C.-190° C.;

an orienting part: 125° C.-160° C.;

a setting part: 95° C.-160° C.

orienting times: 5.5-11 times;

E, traction the cooling water temperature of a cooling roller is between 15° C. and 30° C.;

F, printing speed: 150/min;

temperature of an oven: 40° C.-55° C.

ink: anti-counterfeiting fluorescent transparent ink and food-grade color ink.

Compare the properties of a common cigarette film with the multifunctional BOPP cigarette packaging film of the application as the following table 1:

TABLE 1

| Item | Unit | Common Cigarette Film | Multifunctional BOPP Cigarette Packaging Film |
|---|---|---|---|
| Thickness | μm | ≤23.0 ± 1.0 | ≤18.4 ± 1.0 |
| Tensile Strength | Mpa | longitudinal: 141 transverse: 252 | longitudinal: 149 transverse: 258 |
| Elongation at Break | % | longitudinal: 129 transverse: 67 | longitudinal: 115 transverse: 68 |
| Heat Shrinkage | % | longitudinal: 4.6 transverse: 4.6 | longitudinal: 4.7 transverse: 4.5 |
| Coefficient of Dynamic Friction | | 0.27 | 0.21 |
| Wetness | mN/m | 4 | 3.9 |
| Haze | % | 1.9 | 1.7 |
| Glossiness | % | 9.1 | 10.1 |
| Heat Sealing Strength | N/15 mm | 2.6 | 2.8 |
| Moisture Transmission | g/m² · 24 h | 1.8 | 1.6 |
| Antibacterial Rate | % | | 99.93 |
| Antiviral Rate | % | | 98.11 |

TABLE 1-continued

| Item | Unit | Common Cigarette Film | Multifunctional BOPP Cigarette Packaging Film |
|---|---|---|---|
| Anti-mildew Rate | % | | 100 |
| Anti-counterfeiting Capacity of Product | | | good anti-counterfeiting identification capacity |

Embodiment 7

In the embodiment, the upper layer accounts for 10 percent of the total mass, the middle-upper layer accounts for 15 percent of the total mass, the middle layer accounts for 45 percent of the total mass, the middle-lower layer accounts for 21 percent of the total mass, and the lower layer accounts for 9 percent of the total mass;

the binary copolymerized polypropylene surface layer and the binary copolymerized polypropylene bottom surface layer respectively comprise the following three components in parts by mass: 8 parts of binary copolymerized polypropylene, 1 part of thermoplastic elastomer, and 1 part of super-slip/anti-blocking master batch;

the homopolymerized polypropylene antibacterial agent layer comprises the following three components in parts by mass: 12 parts of homopolymerized polypropylene (PP), 1 part of antibacterial master batch, and 1 part of rapid migration antistatic master batch;

the homopolymerized polypropylene stiffening agent layer comprises the following three components in parts by mass: 26 parts of homopolymerized polypropylene (PP), 1 part of antistatic/slip master batch, and 6 parts of special stiffening master batch.

Other schemes of the embodiment are as same as those of the embodiment 6.

Embodiment 8

In the embodiment, the upper layer accounts for 12 percent of the total mass, the middle-upper layer accounts for 18 percent of the total mass, the middle layer accounts for 50 percent of the total mass, the middle-lower layer accounts for 12 percent of the total mass, and the lower layer accounts for 8 percent of the total mass;

the binary copolymerized polypropylene surface layer and the binary copolymerized polypropylene bottom surface layer respectively comprise the following three components in parts by mass: 9 parts of binary copolymerized polypropylene, 1.5 parts of thermoplastic elastomer, and 1.6 parts of super-slip/anti-blocking master batch;

the homopolymerized polypropylene antibacterial agent layer comprises the following three components in parts by mass: 13 parts of homopolymerized polypropylene (PP), 1.5 parts of antibacterial master batch, and 1.8 parts of rapid migration antistatic master batch;

the homopolymerized polypropylene stiffening agent layer comprises the following three components in parts by mass: 28 parts of homopolymerized polypropylene (PP), 1.5 parts of antistatic/slip master batch, and 8 parts of special stiffening master batch.

Other schemes of the embodiment are as same as those of the embodiment 6.

Embodiment 9

In the embodiment, the upper layer accounts for 14 percent of the total mass, the middle-upper layer accounts for 20 percent of the total mass, the middle layer accounts for 38 percent of the total mass, the middle-lower layer accounts for 13 percent of the total mass, and the lower layer accounts for 15 percent of the total mass;

the binary copolymerized polypropylene surface layer and the binary copolymerized polypropylene bottom surface layer respectively comprise the following three components in parts by mass: 10 parts of binary copolymerized polypropylene, 2.2 parts of thermoplastic elastomer, and 2.4 parts of super-slip/anti-blocking master batch;

the homopolymerized polypropylene antibacterial agent layer comprises the following three components in parts by mass: 14 parts of homopolymerized polypropylene (PP), 2.5 parts of antibacterial master batch, and 2.8 parts of rapid migration antistatic master batch;

the homopolymerized polypropylene stiffening agent layer comprises the following three components in parts by mass: 30 parts of homopolymerized polypropylene (PP), 2.5 parts of antistatic/slip master batch, and 10 parts of special stiffening master batch.

Other schemes of the embodiment are as same as those of the embodiment 6.

Embodiment 10

In the embodiment, the upper layer accounts for 15 percent of the total mass, the middle-upper layer accounts for 21 percent of the total mass, the middle layer accounts for 42 percent of the total mass, the middle-lower layer accounts for 13 percent of the total mass, and the lower layer accounts for 9 percent of the total mass;

the binary copolymerized polypropylene surface layer and the binary copolymerized polypropylene bottom surface layer respectively comprise the following three components in parts by mass: 11 parts of binary copolymerized polypropylene, 3.5 parts of thermoplastic elastomer, and 3.5 parts of super-slip/anti-blocking master batch;

the homopolymerized polypropylene antibacterial agent layer comprises the following three components in parts by mass: 13.5 parts of homopolymerized polypropylene (PP), 3.5 parts of antibacterial master batch, and 3.5 parts of rapid migration antistatic master batch;

the homopolymerized polypropylene stiffening agent layer comprises the following three components in parts by mass: 32.5 parts of homopolymerized polypropylene (PP), 4.5 parts of antistatic/slip master batch, and 20 parts of special stiffening master batch.

Other schemes of the embodiment are as same as those of the embodiment 6.

We claim:

1. A manufacturing method for a multifunctional biaxially-oriented polypropylene film (BOPP) cigarette packaging film, the manufacturing method comprising the following steps:

(1) selecting materials: in the multifunctional BOPP cigarette packaging film, the upper layer is a binary copolymerized polypropylene surface layer, the middle-upper layer and the middle-lower layer are homopolymerized polypropylene antibacterial agent layers, the middle layer is a homopolymerized polypropylene stiffening agent layer, and the lower layer is a binary copolymerized polypropylene bottom surface layer;

the upper layer accounts for 8 to 15 percent of the total mass, the middle-upper layer accounts for 12 to 21 percent of the total mass, the middle layer accounts for 38 to 50 percent of the total mass, the middle-lower layer accounts for 12 to 21 percent of the total mass, and the lower layer accounts for 8 to 15 percent of the total mass;

the binary copolymerized polypropylene surface layer and the binary copolymerized polypropylene bottom surface layer respectively comprise the following three components in parts by mass: 7 to 11 parts of binary copolymerized polypropylene, 0.5 to 3.5 parts of thermoplastic elastomer, and 0.5 to 3.5 parts of anti-blocking master batch;

the homopolymerized polypropylene antibacterial agent layer comprises the following three components in parts by mass: 11 to 14 parts of homopolymerized polypropylene (PP), 0.5 to 3.5 parts of antibacterial master batch, and 0.5 to 3.5 parts of rapid migration antistatic master batch;

the homopolymerized polypropylene stiffening agent layer comprises the following three components in parts by mass: 25.5 to 32.5 parts of homopolymerized polypropylene (PP), 0.5 to 4.5 parts of antistatic/slip master batch, and 5 to 20 parts of stiffening master batch;

(2) manufacturing the film: a co-extrusion biaxial orienting method is adopted, comprising the following processes:

(2.1) feeding prepared mixtures into five extruders through a feeder, wherein the five extruders respectively correspond to the upper layer, the middle-upper layer, the middle layer, the middle-lower layer and the lower layer; extruding in a molten state, filtering for multiple times, feeding the filtrate into a T-shaped die head, and extruding the melt through a die lip; wherein a temperature of the extruder corresponding to the middle layer is controlled to be between 225° C. and 255° C.; temperatures of the extruders corresponding to the upper layer, the middle-upper layer, the middle-lower layer, and the lower layer are each controlled to be between 220° C. and 250° C.; and a temperature of the die head is controlled to be between 235° C. and 260° C.;

(2.2) tape-casting: tightly attaching the melt extruded from the die lip to the surface of a quenching roller, and forming a cast film under the actions of the quenching roller, a water bath and a guide roller; wherein the cooling water temperature of the quenching roller is between 15° C. and 30° C.

(2.4) orienting: leading out the cast film, and performing longitudinal orienting using a longitudinal orienting system and then transverse orienting using a transverse orienting system; wherein parameters of the longitudinal orienting system are controlled as follows: a temperature of a preheating part is controlled to be between 90° C. and 125° C.; a temperature of an orienting part is controlled to be between 70° C. and 90° C.; a temperature of a setting part is controlled to be between 100° C. and 120° C.; and a number of orienting times is 0.8-3.5 times; and parameters of the transverse orienting system are controlled as follows: a temperature of a preheating part is controlled to be between 160° C. and 190° C.; a temperature of an orienting part is controlled to be between 125° C. and 160° C.; a temperature of a setting part is controlled to be between 95° C. and 160° C.; and a number of orienting times is 5.5-11 times;

(2.5) cooling the film;

(2.6) traction winding-up: winding the film into a cylindrical film roll by edge cutting, thickness measuring and corona treatment, and thus obtaining the multifunctional BOPP cigarette packaging film.

2. The manufacturing method for a multifunctional BOPP cigarette packaging film as claimed in claim 1, further comprising the following steps:
(3) finishing:
(3.1) ageing treatment: putting a big roll film on a film collecting rack, and performing ageing treatment for 24 hours;
(3.2) cutting the aged big roll film to obtain small roll films.

3. The manufacturing method for a multifunctional BOPP cigarette packaging film as claimed in claim 2, further comprising the following steps:
(4) printing:
(4.1) making a plate through a plate roller in a laser plate making factory according to the anti-counterfeiting color patterns required to be printed by the design of a cigarette factory;
(4.2) performing anti-counterfeiting printing on the cut small roll films by using fluorescent anti-counterfeiting ink together with color ink in a film color printer, and automatically drying the small roll films in the printing process;
(4.3) automatically winding the anti-counterfeiting color film;
(4.4) cutting in a cutting machine, and thus obtaining the packaging film required by the cigarette factory.

4. The manufacturing method for a multifunctional BOPP cigarette packaging film as claimed in claim 1, wherein in said step (1), according to a proportioning table of each layer, raw materials are conveyed to a proportioning machine by spiral conveying and vibrating conveying and proportioned uniformly; and the mixture is conveyed to a material bin of an extruder corresponding to each layer through a feeder.

5. The manufacturing method for a multifunctional BOPP cigarette packaging film as claimed in claim 1, wherein in said step (2.3), longitudinal orienting is realized under the actions of orienting rollers at different shaft speed and a plurality of pairs of heating rollers in between of a longitudinal orienting mechanism; and in a transverse area, two sides of the film are clamped by a chain clamp, the film moves forward along a gradually widening track, the width of the film meets a requirement through a heating area and a setting area, and the film reaches the set thickness and width after longitudinal orienting and transverse orienting.

6. The manufacturing method for a multifunctional BOPP cigarette packaging film as claimed in claim 2, wherein in said step (1), according to a proportioning table of each layer, raw materials are conveyed to a proportioning machine by spiral conveying and vibrating conveying and proportioned uniformly; and the mixture is conveyed to a material bin of an extruder corresponding to each layer through a feeder.

7. The manufacturing method for a multifunctional BOPP cigarette packaging film as claimed in claim 3, wherein in said step (1), according to a proportioning table of each layer, raw materials are conveyed to a proportioning machine by spiral conveying and vibrating conveying and proportioned uniformly; and the mixture is conveyed to a material bin of an extruder corresponding to each layer through a feeder.

8. The manufacturing method for a multifunctional BOPP cigarette packaging film as claimed in claim 2, wherein in said step (2.3), longitudinal orienting is realized under the actions of orienting rollers at different shaft speed and a plurality of pairs of heating rollers in between of a longitudinal orienting mechanism; and in a transverse area, two sides of the film are clamped by a chain clamp, the film moves forward along a gradually widening track, the width of the film meets a requirement through a heating area and a setting area, and the film reaches the set thickness and width after longitudinal orienting and transverse orienting.

9. The manufacturing method for a multifunctional BOPP cigarette packaging film as claimed in claim 3, wherein in said step (2.3), longitudinal orienting is realized under the actions of orienting rollers at different shaft speed and a plurality of pairs of heating rollers in between of a longitudinal orienting mechanism; and in a transverse area, two sides of the film are clamped by a chain clamp, the film moves forward along a gradually widening track, the width of the film meets a requirement through a heating area and a setting area, and the film reaches the set thickness and width after longitudinal orienting and transverse orienting.

10. The manufacturing method for a multifunctional BOPP cigarette packaging film as claimed in claim 1, wherein an intrinsic viscosity of the homopolymerized PP is between 0.58 dl/g and 0.65 dl/g, a fluctuation range of a molecular weight of the homopolymerized PP is less than or equal to +/−0.01, and contents of impurities and gel in the homopolymerized PP are less than or equal to 0.02 percent.

11. The manufacturing method for a multifunctional BOPP cigarette packaging film as claimed in claim 10, wherein a particle diameter of each master batch is less than 1.5 microns.

12. The manufacturing method for a multifunctional BOPP cigarette packaging film as claimed in claim 1, wherein a particle diameter of each master batch is less than 1.5 microns.

* * * * *